United States Patent [19]

Shirouzu et al.

[11] 4,300,395

[45] Nov. 17, 1981

[54] SEMICONDUCTOR PRESSURE DETECTION DEVICE

[75] Inventors: Shunji Shirouzu, Ayase; Ryuzo Noda, Kawasaki, both of Japan

[73] Assignee: Tokyo Shibaura Denki Kabushiki Kaisha, Kawasaki, Japan

[21] Appl. No.: 87,938

[22] Filed: Oct. 25, 1979

[30] Foreign Application Priority Data

Nov. 8, 1978 [JP] Japan ................................ 53-137502
Nov. 13, 1978 [JP] Japan ................................ 53-139518
May 1, 1979 [JP] Japan ................................ 54-53843
Oct. 1, 1979 [JP] Japan ................................ 54-126552

[51] Int. Cl.³ ............................................. G01L 19/04
[52] U.S. Cl. ....................................... 73/708; 73/727; 338/4; 338/7; 338/42
[58] Field of Search ................. 73/708, 720, 721, 726, 73/727, 766; 338/4, 7, 8, 42; 357/26

[56] References Cited

U.S. PATENT DOCUMENTS 3,836,796 9/1974 Solomon et al. ....................... 73/766
4,202,218 5/1980 Romo ..................................... 73/708

FOREIGN PATENT DOCUMENTS 5240184 9/1975 Japan .

OTHER PUBLICATIONS

Honeywell Report, "The Diffused Silicon Approach to Differential Pressure Measurement", by John A. Weaver, pp. 103-110.

Primary Examiner—Donald O. Woodiel
Attorney, Agent, or Firm—Oblon, Fisher, Spivak, McClelland & Maier

[57] ABSTRACT

A semiconductor pressure detection device is provided which is adapted to detect pressure using resistors formed in the surface area of a semiconductor substrate and having a piezo-effect. A diode is formed in the surface area of the semiconductor substrate and a drive voltage corresponding to a temperature variation is supplied to a bridge circuit through the diode.

8 Claims, 11 Drawing Figures

SEMICONDUCTOR PRESSURE DETECTION DEVICE

BACKGROUND OF THE INVENTION

This invention relates to a semiconductor pressure detection device using a semiconductor diffusion resistor having a piezo-effect.

A semiconductor pressure detection device is conventionally used in which a bridge circuit is formed using the diffusion resistors of a semiconductor as pressure-sensitive gauge resistors. Since in such a device the characteristic variation of the gauge resistor with respect to the temperature exerts greater influence to the result of detection, the temperature compensation is conducive to the improvement of a device performance.

FIG. 1 is a circuit diagram showing a conventional semiconductor pressure detection device. Gauge resistors R1, R2 are formed in a surface region of a semiconductor single-crystal substrate and show a resistance variation in a mutually different direction according to pressure applied. A bridge circuit is created by such resistors R1, R2 and pressure-insensitive resistors R3, R4. A constant power source VE is connected to the bridge circuit. The bridge circuit takes a balanced state when no pressure is applied. When pressure is applied, the bridge circuit is put in the off-balance state and a voltage ΔV according to pressure applied is taken out of the bridge circuit. In general, such bridge circuit is such that, when the external temperature varies, output voltage (zero voltage) in the balanced state (when no pressure is applied) varies and at the same time the pressure sensitivity of the gauge resistor varies. If, therefore, a pressure-insensitive resistor RS is connected in series with the gauge resistor R1, a series circuit of the resistors R1 and RS is connected in parallel with a pressure-insensitive resistor RP, and the resistors RS and RP are selected to have proper values, then the apparent temperature coefficient of the gauge resistor R1 is made to approach to that of the resistor R2 within a temperature range used whereby the temperature compensation of the zero voltage is effected. To effect the temperature compensation of the pressure sensitivity it is necessary to vary drive voltage according to the external temperature. A temperature-sensitive resistor element RT such as a thermister is connected in series with the constant power source so as to obtain drive voltage VB according to the temperature. Such a temperature compensation system has the following drawback. Since in this system the zero voltage compensation element and pressure-sensitive compensation element are provided separately from each other, they suffer a different temperature and if drive voltage is varied according to the temperature there arises a problem that a once-compensated zero voltage varies. Particularly where the external temperature is varied rapidly, the zero voltage could not be adjusted according to the drive voltage, producing a compensation error. Further, since the pressure-insensitive resistor is connected in parallel with the gauge resistor the linearity of the pressure-sensitive characteristic of the gauge resistor is deteriorated, impairing a measuring accuracy.

SUMMARY OF THE INVENTION

It is accordingly the object of this invention to provide a semiconductor pressure detection device capable of improving measuring accuracy by simultaneously effecting the temperature compensation of zero voltage and pressure sensitivity.

According to this invention there is provided a semiconductor pressure detection device comprising a semiconductor substrate of a first conductivity type, a first semiconductor region of a second conductivity type formed in the surface area of a semiconductor substrate to provide, together with the semiconductor substrate, a temperature-sensitive diode, a power supply means for generating a drive output which is supplied through the diode, and a bridge circuit including a second semiconductor region of a second conductivity type formed in the surface area of a semiconductor substrate and constituting a resistor having a piezo-effect, said bridge circuit being adapted to receive the drive voltage.

DETAILED DESCRIPTION OF THE PREFERRED EMBODIMENTS

A semiconductor pressure detection device according to one embodiment of this invention will be explained below by referring to drawings.

Figure 1:
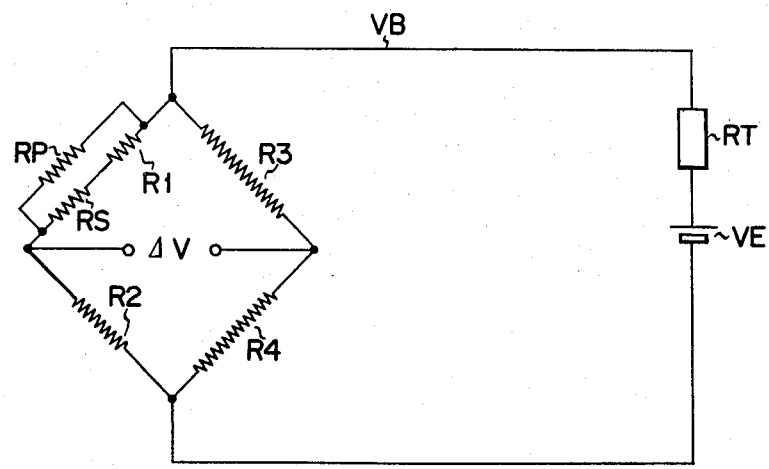
FIG. 1 is a circuit diagram showing a conventional semiconductor pressure detection device.
Figure 2:
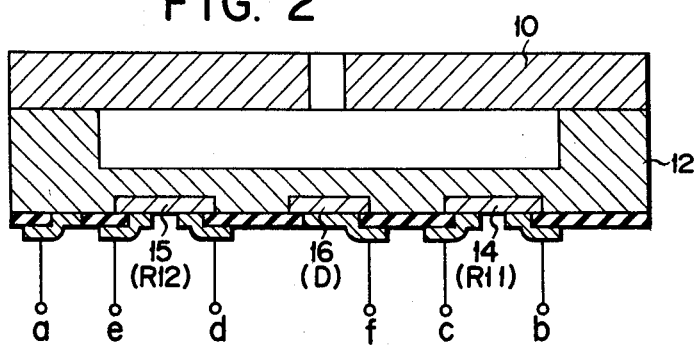
FIG. 2 is a cross-sectional view showing one form of sensor section which is a major portion of a semiconductor pressure detection device of this invention.

FIG. 2 is a cross-sectional view showing a structure of a sensor section. In FIG. 2 an n-type silicon single-crystal substrate 12 is bonded by an adhesive such as glass or Au-Si alloy to a silicon base 10 having a pressure introduction hole. A one surface of the substrate 12 which is faced to the base 10 is recessed at the central portion to provide a pressure-sensitive diaphragm. Boron is diffused in the other surface of the substrate 12 to form p-type diffusion layers 14, 15 and 16. The p-type diffusion layers 14, 15 have a piezo-effect and are used as gauge resistors R11, R12 whose resistive values vary in the positive and negative directions according to the pressure. The p-type diffusion layer 16 is used as a PN junction diode D whose forward voltage varies according to the temperature. Aluminum electrodes are attached to the substrate 12 and diffusion layers 14, 15 and 16 to which terminals a to f are connected.

Figure 3:
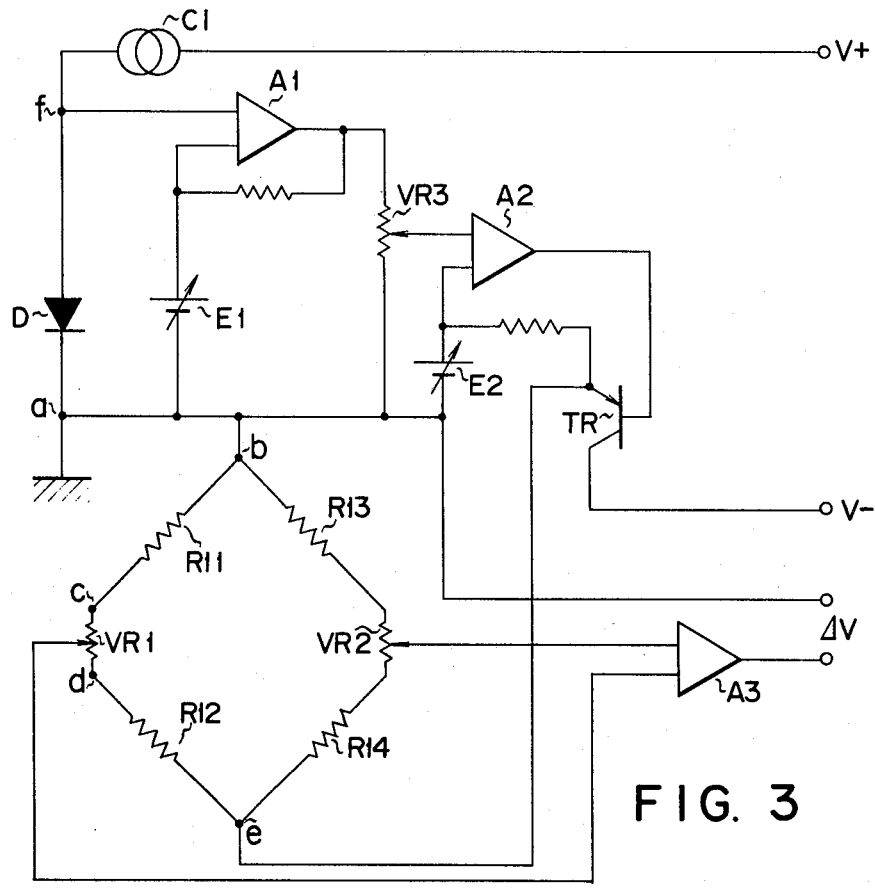
FIG. 3 is a circuit diagram showing a semiconductor pressure detection device according to a first embodiment of this invention.

FIG. 3 is a schematic diagram showing a semiconductor pressure detection device in which the above-mentioned sensor section is incorporated. The terminals a to f of FIG. 2 correspond to terminals a to f of FIG. 3. A bridge circuit is constructed of pressure-sensitive gauge resistors R11, R12 and pressure-insensitive resistors R13, R14. A voltage dividing resistor VR1 is connected between the gauge resistors R11 and R12 and a voltage dividing resistor VR2 is connected between the resistors R13 and R14. The terminal a attached to the substrate 12 is grounded and connected to one power supply terminal b of the bridge circuit. A PN junction diode D constituting a temperature-sensitive element is connected between the terminal a and the terminal f of the p-type diffusion layer 16. The diode D is connected through a constant current source CI to a reference power supply V+ such that it is forward-biased. A positive voltage from the constant current source CI is amplified by amplifiers A1 and A2 and supplied to the base of a transistor TR. The emitter output of the transistor TR is connected as drive voltage −VB to the other power supply terminal e of the bridge circuit. In this way, the PN junction between the P-type diffusion layers 14, 15 and the substrate 12 is reverse-biased and the gauge resistors R11 and R12 are electrically separated from the substrate 12. Even if the PN junction diode between the diffusion layer 16 and the substrate is used as a forward bias and as the temperature-sensitive element it is possible to prevent a mutual influence between the temperature-sensitive element and the pressure-sensitive resistors R11, R12. The collector of the transistor TR is connected to a reference power supply V−. Drive voltages E1, E2 of the amplifiers A1 and A2, respectively, are provided by the reference power supplies V+, V−. A variable resistor VR3 is connected between the amplifiers A1 and A2 and adjusts the zero output (output at the reference temperature time and when no pressure is applied) of the diode D. Voltage dividing points of the voltage dividing resistors VR1, VR2 in the bridge circuit are connected through a sensor amplifier A3 to an output terminal and a voltage between the above-mentioned voltage dividing points of VR1 and VR2 is detected through the sensor amplifier A3 as a detection pressure.

The operation of the semiconductor pressure detection device of this invention will be explained below.

The principle of pressure detection is based on the fact that the resistive values of the gauge resistors R11 and R12 vary according to the pressure applied and the output of the bridge is correspondingly varied. Such pressure detection device is used over a wider temperature range and, therefore, a temperature compensation method will be explained below.

A temperature compensation with respect to the pressure sensitivity will first be explained below.

Figure 4:
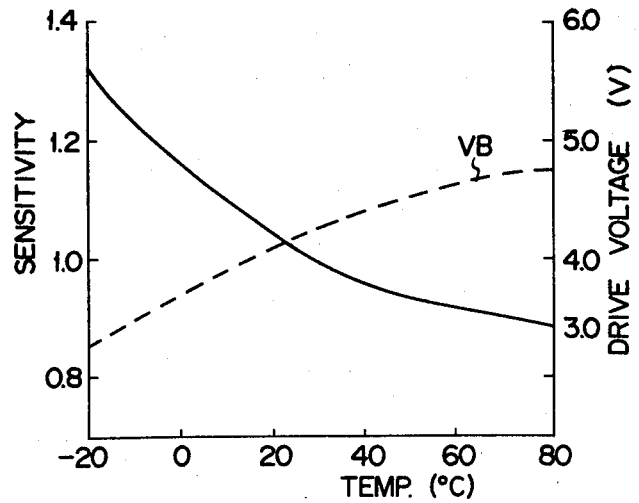
FIG. 4 is a characteristic curve diagram showing a pressure sensitivity vs. drive voltage relation.

In general, the diode D shows a voltage variation of about several millivolts per temperature variation of 1° C. The voltage variation is applied through the amplifiers A1, A2 to the base of the transistor TR whereby the drive voltage of the bridge circuit VB is controlled. FIG. 4 is a graph showing a pressure sensitivity to temperature relation. When the bridge circuit is driven at a constant voltage of VB=4.25 V with a predetermined pressure applied (see the solid line). A pressure sensitivity i.e. a relative output with respect to an outpt ΔV at 30° C. when a predetermined pressure is applied is plotted as the ordinate, and the temperature as the abscissa. As evident from the graph of FIG. 4 the relative sensitivity is 1.31 at −20° C. and 0.89 at 80° C. It will be seen that in order for the relative sensitivity to be 1 at all times over a temperature range of −20° to 80° C. the drive voltage VB is made 3.25 V at −20° C. and 4.75 V at 80° C. as indicated by a broken line in FIG. 4. The drive voltage VB is controlled by adjusting the gain of the amplifiers A1, A2 and resistive value of the variable resistor VR3. By so doing, the error of the relative sensitivity is held in a temperature range of −20° to 80° C.±0.2%.

The zero voltage compensation with respect to the temperature will be explained below.

Figure 5:
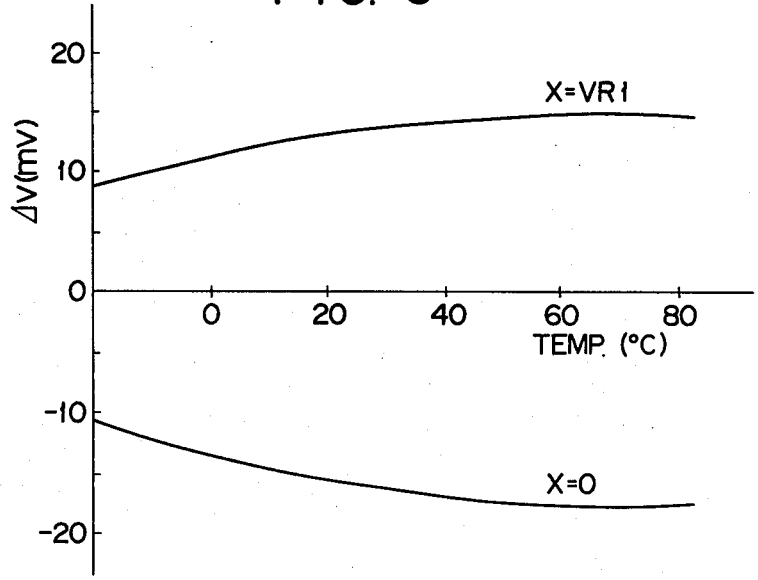
FIGS. 5 and 6 show characteristic curves for explaining a temperature compensation with respect to a pressure sensitivity.

Now suppose that zero voltage ΔV is taken out between the fixed voltage dividing point of a resistive value VR2/2 and the variable voltage dividing point of a resistive value X as viewed from the ground side. FIG. 5 shows the temperature characteristic (−20° to 80° C.) of the zero voltage ΔV. Here it is assumed that the drive voltage VB varies according to the temperature as shown in FIG. 4 and that X=VR1=50Ω and X=0. In this case it is also assumed that no pressure is applied. As evident from FIG. 5 the temperature characteristic curve of the zero voltage ΔV is such that an upward curve is provided at X=VR1 and a downward curve is provided at X=VR1 and a downward curve is provided at X=0. That is, the variation of the zero voltage ΔV with respect to the temperature can be linearized by properly selecting the variable voltage dividing point of the output of the bridge. In other words, in this state these second or more degree coefficients of ΔV with respect to the temperature of the temperature variation curve become zero, and thus the temperature variation of the zero voltage ΔV becomes similar to that of the bridge supply voltage.

A method for finding such variable dividing point will be explained below.

First, a ratio of an average voltage gradient ΔVBh at 30° to 80° C. to an average voltage gradient ΔVBl at −20° to 30° C. of the bridge drive voltage VB is found.

$$\frac{\Delta VBh}{\Delta VBl} = \frac{4.75 - 4.25}{4.25 - 3.25} = 0.5 \tag{1}$$

The zero voltage ΔVR, ΔVO at −20° C., 30° C. and 80° C. when X=VR1 and X=0 can be expressed as follows:

ΔVR(−20)=A1, ΔVO(−20)=Ao

ΔVR(30)=B1, ΔVO(30)=BO

ΔVR(80)=Cl, ΔVO(80)=Co

In order for the temperature characteristic of the zero voltage ΔV to become similar to that of the drive voltage VB a ratio between the average voltage gradients of the zero voltage ΔV must be made equal to the ratio between the average voltage gradients of the drive voltage VB and thus the following equation must be satisfied:

$$\frac{\left\{(C1-C0)\frac{X}{VR1} + C0\right\} - \left\{(B1-B0)\frac{X}{VR1} + B0\right\}}{\left\{(B1-B0)\frac{X}{VR1} + B0\right\} - \left\{(A1-A0)\frac{X}{VR1} + AO\right\}} = 0.5 \tag{2}$$

Substituting the values of FIG. 5 into Equation (2) gives:

$X/VR1 = \frac{1}{3}$

When $VR1 = 50\Omega$, $X \approx 17\Omega$. The voltage dividing point of the voltage dividing resistor VR1 is set at $X = VR1/3$ and the drive voltage VB is varied as shown in FIG. 4 by varying the temperature The zero voltage $\Delta V$ herein defined means a voltage as viewed from the fixed voltage dividing point of the voltage dividing resistor VR2. If the drive voltage VB varies according to the temperature the potential on the fixed voltage dividing point also varies. It is therefore necessary that such a variation be compensated by causing the potential on the fixed voltage dividing point to vary according to the variation of the potential on the variable voltage dividing point of the bridge. Although those second or more degree coefficients relating to the temperature are caused to become zero, it is necessary in this case that those first degree coefficients relating to the temperature be made zero. As shown in FIG. 4 the variation of the drive voltage VB is 1.5 V in a temperature range of $-20°$ to $80°$ C. and the zero voltage $\Delta V$ is varied by 3 mV. Therefore, the fixed voltage dividing point needs only to be shifted from a point VR2/2 side to the resistor R14 side by 3VR2/1500.

Figure 6:
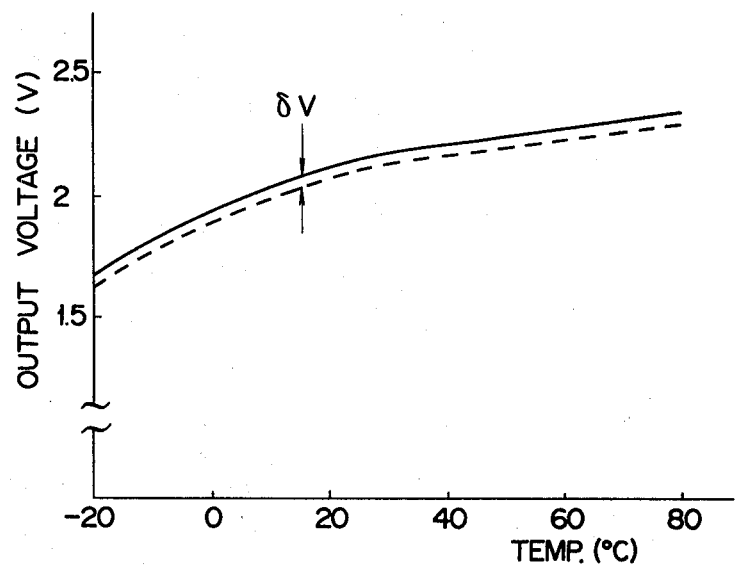

FIG. 6 shows potentials on both the output terminals of the bridge circuit as viewed from the ground potential. In FIG. 6 the solid line shows output potential on the output terminal at the variable resistor VR1 side i.e. on the point VR1/3 and the broken line shows output voltage on the output terminal at the variable resistor VR2 side i.e. on the point VR2/2+3VR2/1500. By so doing, both the potentials similarly vary with a difference $\delta V = 2$ mV kept as shown in FIG. 6. The balanced voltage can be made zero irrespective of the temperature if $\delta V$ is subtracted circuit-wise.

In this embodiment, the temperature-sensitive element for temperature compensation is integrally formed on the semiconductor substrate constituting the pressure sensor. In consequence, the pressure-sensitive resistor element and temperature-sensitive element are substantially independent of the temperature variation and thus the temperature compensation can be made more accurately with respect to the pressure sensitivity. Even if the variation of the external temperature is rapid, accurate temperature compensation can be effected irrespective of the temperature variation speed. Further, the pressure-sensitive element and temperature-sensitive element are the same in their material and in the history of the manufacturing process etc. and in consequence the temperature characteristics of both can be easily made equal to each other, thus assuring accurate temperature compensation with respect to the pressure sensitivity. Moreover, the pressure-sensitive element and temperature-sensitive element can be readily formed by one impurity diffusion process. This can be done using two power supply (positive and negative power supplies V+, V−) system. Suppose that in FIG. 3, for example, diodes are formed as the temperature-sensitive element and the resistors R11, R12 as the pressure-sensitive elements on the same substrate. In order to apply a required bias to the diodes using a single power supply, a complicated process such as a double diffusion is required so that these elements may be electrically separated from each other. Accordingly to this embodiment, on the other hand, the structure as well as the manufacturing process of the pressure sensor section can be simplified since the two power supply system is adopted. The temperature compensation of the zero voltage can be also effected according to the temperature compensation with respect to the pressure sensitivity of the temperature-sensitive element. Although in the above-mentioned embodiment the pressure-sensitive resistor element and temperature-sensitive element are formed by forming the p-type diffusion layers in the n-type semiconductor substrate, their conductivity type may be reversed. In this case, the biasing relation is reversed with respect to the above-mentioned embodiment.

Figure 7:
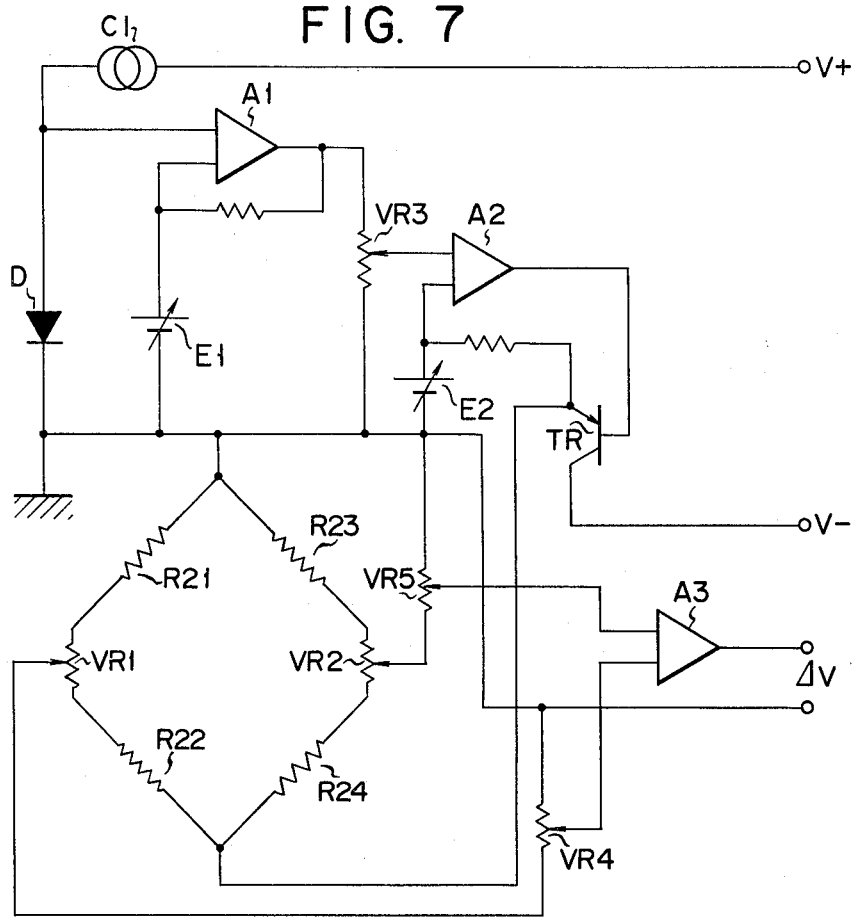
FIG. 7 is a circuit diagram showing a semiconductor pressure detection device according to a second embodiment of this invention.

A semiconductor pressure detection device according to a second embodiment of this invention will be explained below. In this embodiment, a bridge circuit is formed so as to provide a greater pressure detection range. FIG. 7 is a schematic diagram showing the second embodiment of this invention. The same reference numerals are employed to designate parts or elements corresponding to those shown in FIG. 3 and further explanation will be therefore omitted. In this embodiment, four pressure-sensitive elements constitute elements on the four arms of the bridge circuit. For example, resistors R21 and R24 are gauge resistors whose resistive values are increased by pressure and resistors R22 and R23 are gauge resistors whose resistive values are decreased. The voltage dividing points of voltage dividing resistors VR1 and VR2 for the temperature compensation of the zero voltage are connected between the corresponding gauge resistors and respectively through variable resistors VR4 and VR5 to a sensor amplifier A3. In this embodiment the gauge resistors R21, R22, R23, R24 and diode D are formed in the same semiconductor substrate. Like the first embodiment, a transistor TR is controlled by the diode D according to the external temperature and thus the drive voltage of the bridge circuit is adjusted to effect temperature compensation with respect to the pressure sensitivity.

Explanation will be given below to a method for effecting a temperature compensation of the zero voltage of this bridge circuit.

Figure 8:
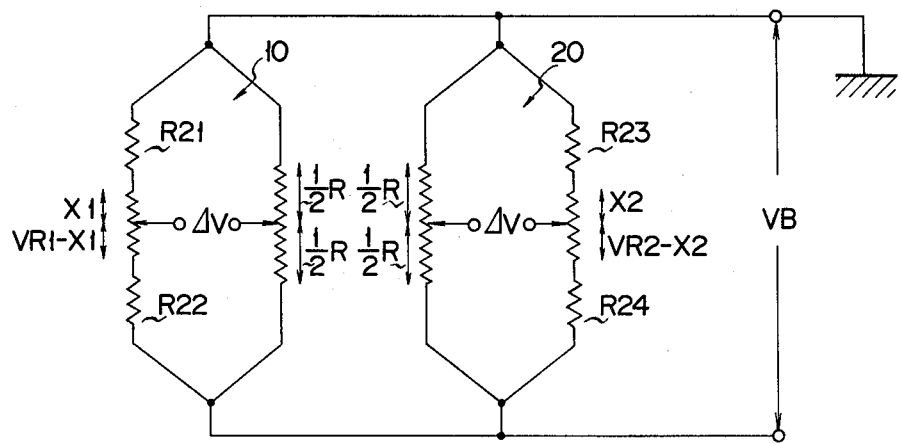
FIG. 8 is an equivalent circuit for explaining the circuit of FIG. 7.

This bridge circuit will be explained below in a manner divided into two bridge circuits as shown in FIG. 8. The first bridge circuit 10 includes the gauge resistors R21, R22 and temperature-insensitive resistor R, and a voltage dividing resistor VR1 is connected between the gauge resistor R21 and R22. Zero voltage $\Delta V1$ is taken out between a variable voltage dividing point X1 of the voltage dividing resistor VR1 and a fixed voltage dividing point R/2 of a resistor R. The second bridge 20 is likewise constituted. Drive voltage varying with the temperature variation is applied to these bridges 10, 20.

Figure 9:
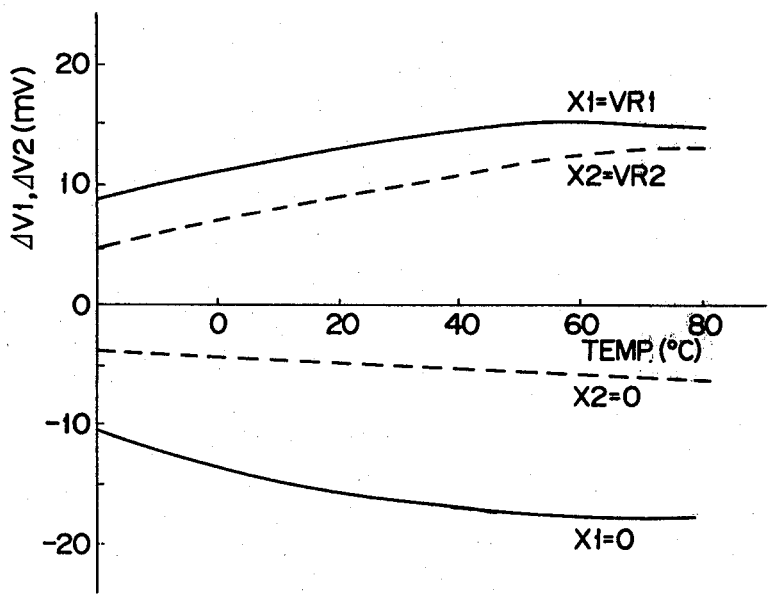
FIGS. 9 and 10 show characteristic curves for explaining a temperature compensation with respect to a pressure sensitivity.

FIG. 9 shows the temperature characteristic ($-20°$ to $80°$ C.) of the zero voltage. In FIG. 9 the solid line shows zero voltage $\Delta V1$ and the broken line zero voltage $\Delta V2$. Suppose that the drive voltage VB varies as in the first embodiment and that the variable voltage dividing point $X1 = VR1 = 0$ and $X2 = VR2 = 0$. Also suppose that $VR1 = 50\Omega$ and $VR2 = 100\Omega$. In order for the temperature characteristic of the zero voltages $\Delta V1$, $\Delta V2$ of the bridge circuits 10, 20 to become similar to that of the drive voltage the respective bridge circuits 10, 20 must satisfy the above-mentioned Equation (2). Substituting the values of FIG. 9 in Equation (2) yields $X1/VR1 = \frac{1}{3}$ and $X2/VR2 = \frac{3}{4}$. Since $VR1 = 50\Omega$ and $VR2 = 100\Omega$, $X1 = 17\Omega$ and $X2 = 75\Omega$. Here, the fixed voltage dividing point R/2 of the resistor of the respective bridge circuits 10, 20 provides a common potential point. If the bridge portion having the gauge resistors R21 and R22 and bridge portion having the gauge resistors R23 and R24 are combined except for the resistor R a bridge circuit as shown in FIG. 7 is obtained. Since, however, those first degree terms relating to the temperature are left in the equation of the voltage between the variable voltage dividing point at the VR1 side and the variable voltage dividing point at the VR2 side, they have to be temperature-compensated by a new means. This can be done by connecting a variable resistor VR4 between the variable voltage dividing point X1 of the variable resistor VR1 in one bridge portion and ground and a variable resistor VR5 between the variable voltage dividing point X2 of the variable resistor VR2 in the other bridge portion and ground and selecting output terminals X4, X5. Table 1 shows the variation of the potentials on the variable voltage dividing point X1 and X2 with respect to the temperature when viewed from the fixed voltage dividing point R/2 side and from the ground potential side.

TABLE 1

| Temperature | | −20° C. | 30° C. | 80° C. |
|---|---|---|---|---|
| Potential on point X1 (mV) | viewed from R/2 side | −4.67 | −6.67 | −7.67 |
| | viewed from ground side | 1620.33 | 2118.33 | 2367.33 |
| Potential on point X2 (mV) | viewed from R/2 side | 2.75 | 6.25 | 8.00 |
| | viewed from ground side | 1627.75 | 2131.25 | 2383.00 |

Figure 10:
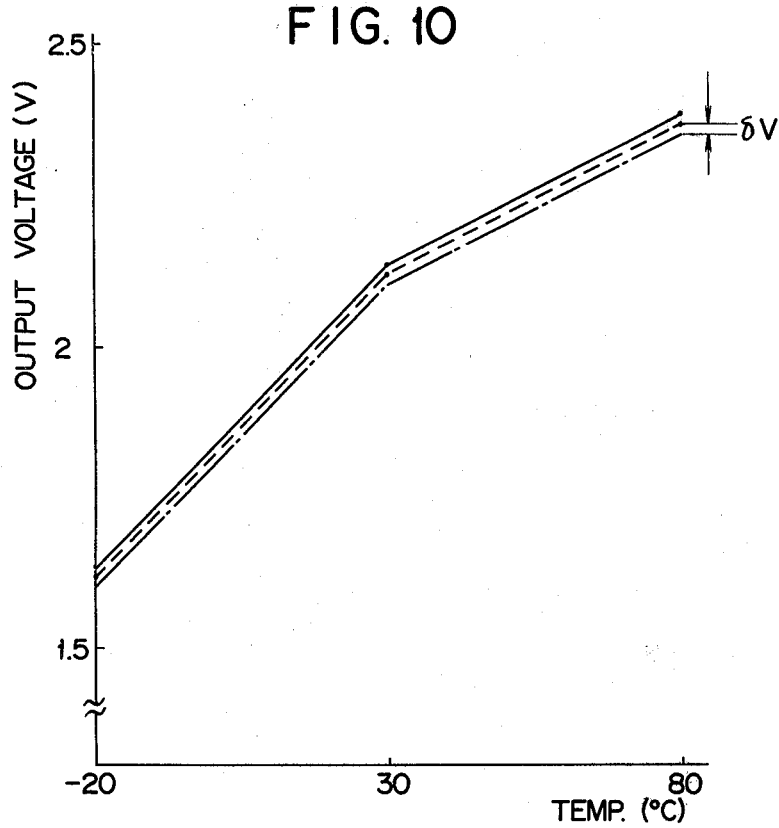

FIG. 10 shows the variation of the potentials on the variable voltage dividing point X1, X2 with respect to the temperature as viewed from the ground potential side. In FIG. 10, the solid line shows the variation of the potential on the varaible voltage dividing point X1 with respect to the temperature and the broken line the variation of the potential on the variable voltage dividing point X2 with respect to the temperature. The potential variation in the temperature range of −20° to 80° C. is such that it is 747 mV at the variable voltage dividing point X1 and 755.25 mV at the variable voltage dividing point X2. If the variable midpoint of the variable resistor VR5 is properly selected with respect to the output of VR2 it is possible to determine a variable midpoint X5 where the same potential variation as that of the variable voltage dividing point X1 is obtained. If the variable midpoint X5 is placed as the point of the resistive value as viewed from the ground side,

X5/VR5=747/755.25=0.9891

The potential on the point X5 as viewed from the ground potential side will be as follows:

| TEMP | −20° C. | 30° C. | 80° C. |
|---|---|---|---|
| Voltage (mV) | 1610.01 | 2108.02 | 2357.03 |

The dotted-broken line in FIG. 10 shows the variation of the potential on the variable midpoint X5 with respect to the temperature. In this way, the variations of the potentials on the points X1 and X5 with respect to the temperature become equal to each other and a potential difference between the points X1 and X5 becomes a predetermined value of $\delta V = 10.3$ mV. At this time, the resistive value of the variable resistor VR4 as shown in FIG. 7 becomes zero (Note that an output terminal is located at the resistive value VR4 point as viewed from the ground side). If the variable midpoints X1 and X5 are regarded as the output terminals, the zero voltage has a small value of $\delta V$ and can compensate the voltage variation resulting from the temperature variation. Where in the temperature range of −20° to 80° C. the variation of a potential on the variable voltage dividing point X1 is greater than that on the variable voltage dividing point X2 a variable midpoint X4 of the variable resistor VR4 is selected with the resistive value of the variable resistor VR5 as a zero and if in this case the points X2, X4 are regarded as the output terminals the zero voltage can be temperature-compensated.

Explanation will be given below of the other method for compensating the zero voltage of the semiconductor pressure detection device according to this invention.

For convenience of explanation suppose that the device is constructed as shown in FIG. 3 and that the drive voltage VB for the compensation of the pressure sensitivity linearly varies such that it is 4 V at −20° C., 5 V at 30° C. and 6 V at 80° C. Also suppose that the voltage dividing point of the voltage dividing resistor VR1 is regarded as the point of a resistive value X as viewed from the ground side with a potential on the voltage dividing point as VX and that the voltage dividing point of the voltage dividing resistor VR2 is regarded as the point of a resistive value Y as viewed from the ground side with a potential on the voltage dividing point as VY. In this case, a bridge output, i.e. a zero voltage $\Delta V$, appearing between both the voltage dividing points when no pressure is applied is made $\Delta V = VX - VY$. The potentials VX, VY are as shown in Table 2.

TABLE 2

| temp. | VX (V) | VY (V) |
|---|---|---|
| −20° C. | $4 \times \frac{R11(-20) + X}{R11(-20) + R12(-20) + VR1}$ | $4 \times \frac{R13 + Y}{R13 + R14 + VR2}$ |
| 30° C. | $5 \times \frac{R11(30) + X}{R11(30) + R12(30) + VR1}$ | $5 \times \frac{R13 + Y}{R13 + R14 + VR2}$ |
| 80° C. | $6 \times \frac{R11(80) + X}{R11(80) + R12(80) + VR1}$ | $6 \times \frac{R13 + Y}{R13 + R14 + VR2}$ |

In Table 2, R11(T), R12(T) show the resistive values of gauge resistors R11, R12 at a temperature of T° C. We first find an output terminal of VR1 at which the inclination of a variation of the zero voltage at −20° to 30° C. is equal to the inclination of a variation of the zero voltage at 30° to 80° C. i.e. the zero voltage linearly varies. That is, it is only necessary to find a value of the resistor which satisfies the following equation:

$$VX(30° C.) - VX(-20° C.) = VX(80° C.) - VX(30° C.) \qquad (3)$$

where VR1=71Ω, R13=R14=4000Ω, and VR2=0.

Figure 11:
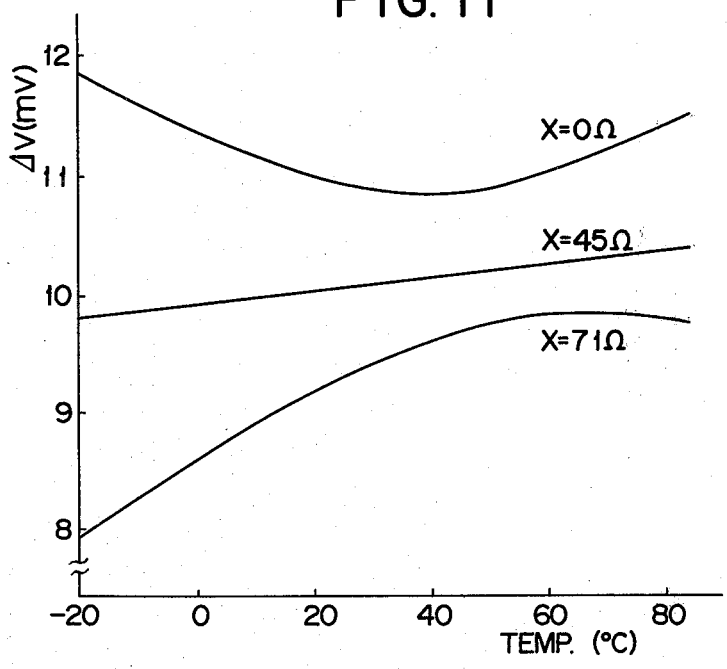
FIG. 11 shows a characteristic curve for explaining another temperature compensation with respect to a pressure sensitivity.

FIG. 11 is graph showing the temperature characteristic of the zero voltage when the value of x is varied. In this case it is supposed, as mentioned above, that the drive voltage linearly varies. From the graph of FIG. 11 the relation of Equation (3) is satisfied when X=45Ω.

The temperature characteristic of the zero voltage shows a downwardly-concave parabolic curve at $X < 45\Omega$ and an upwardly-concave parabolic curve at $X < 45\Omega$. If in this way Equation (3) is satisfied the temperature characteristic of the zero output of the bridge circuit is linearized. If the potential VY on the output terminal at the fixed resistor side is made to follow the variation of VX, the temperature characteristic of the zero voltage can be linearized with no inclination i.e. the zero output can be made a predetermined value at all times. That is, it is only necessary to fined a value of the resistor Y which satisfies the following equation:

$$VX(80° C.) - VX(20° C.) = VY(80° C.) - VY(-20° C.) \quad (4)$$

Suppose that $VX(-20° C.) = 2000$ mV and $VX(80° C.) = 3018$ mV when at $VR1 = 71\Omega$ and $X = 45\Omega$ Equation (3) is satisfied. If in this case $VR2 = R13 = R14 = 4000\Omega$, $$\begin{aligned}
&VX(80° C.) - VX(-20° C.) \\
&= 1.018\ V \\
&= VY(80° C.) - VY(-20°C.) \\
&= 6 \times \frac{R13 + Y}{R13 + R14 + VR2} - 4 \times \frac{R13 + Y}{R13 + R14 + VR2}
\end{aligned}$$

From this $Y = 2108\Omega$ is obtained. At this time, the zero voltage $\Delta V = VX - VY$ becomes:

$$\begin{aligned}
&VX(80° C.) - VY(80° C.) \\
&= VX(-20° C.) - VY(-20° C.) \\
&= -36mV.
\end{aligned}$$

In consequence, if a predetermined voltage of 36 mV is add to the zero voltage the zero voltage of the bridge circuit can be made zero at all times irrespective of the temperature variation.

What we claims:

1. A semiconductor pressure detection device comprising:
   a semiconductor substrate of a first conductivity type;
   a first semiconductor region of a second conductivity type formed in the surface area of said semiconductor substrate to provide, together with said semiconductor substrate, a temperature-sensitive diode;
   power supply means connected to said diode to generate a voltage according to a variation of a forward voltage of said diode resulting from a temperature variation; and
   a bridge circuit including a resistive semiconductor region of said second conductivity type which is formed in the surface area of said semiconductor substrate and has a piezo-effect, said bridge circuit being adapted to receive an output voltage of said power supply means and produce output voltage according to pressure applied;
   wherein said semiconductor substrate is made of an N-type semiconductor and attached to a base having a pressure introduction hole, the semiconductor region of said second conductivity type is made of a P-type semiconductor, and said power supply means comprises a first reference power supply for supplying a reference voltage to a diode, an amplifier connected to said diode and a second reference power supply for controlling an output voltage by a transistor which is controlled by an output of said amplifier.

2. A semiconductor pressure detection device comprising:
   a first reference voltage terminal adapted to receive a first reference voltage;
   a second reference voltage terminal adapted to receive a second reference voltage different from the first reference voltage;
   a semiconductor substrate of a first conductivity type;
   a semiconductor region of a second conductivity type formed in the surface area of the semiconductor substrate connected to the first reference voltage terminal and biased in forward direction and constituting a temperature-sensitive diode together with the semiconductor substrate;
   a bridge circuit having resistive semiconductor regions of the second conductivity type formed in the surface area of the semiconductor substrate connected to the second reference voltage terminal and biased in reverse direction and possessing piezo-effect; and
   a transistor connected to the semiconductor region, the resistive semiconductor regions and the second reference voltage terminal and adapted to apply the second reference voltage to the resistive semiconductor region in accordance with the terminal voltage of said diode.

3. A semiconductor pressure detection device according to claim 2, in which said semiconductor substrate is of N type and connected to ground, said resistive semiconductor regions are of P type, and said first and second reference voltage terminals are connected respectively to a positive voltage source and a negative voltage source.

4. A semiconductor pressure detection device according to claim 1 or claim 3 in which said bridge circuit comprises a first bridge portion including two resistive semiconductor regions each showing a mutually opposite-polarity piezo-effect and a first voltage dividing resistor connected between said two resistive semiconductor regions and having no piezo-effect and a second bridge portion including a second voltage dividing resistor having no piezo-effect, in which an output voltage is detected between the first and second voltage dividing points.

5. A semiconductor pressure detection device according to claim 1 or claim 3 in which said bridge circuit comprises a first bridge portion including two resistive semiconductor regions each showing a mutually opposite-polarity piezo-effect and a first voltage dividing resistor connected between said two resistive semiconductor regions and having no piezo-effect, a second bridge portion including two resistive semiconductor regions each having a mutually opposite-polarity piezo-effect and a second voltage dividing resistor connected between said two resistive semiconductor region and having no piezo-effect, said first and second bridge circuit portions being combined such that the adjacent elements each have an opposite-polarity piezo-effect, and first and second variable resistors connected to voltage dividing points of said first and second voltage resistors, respectively, in which an output voltage is detected between the first variable resistor and the second variable resistor.

6. A temperature compensation method for a semiconductor pressure detection device comprising a bridge circuit which is formed of a first bridge portion including two resistors each having matually opposite-polarity piezo-effect and a first voltage dividing resistor connected between the two resistors and having no piezo-effect and a second bridge portion including a second voltage dividing resistor having no piezo-effect in which an output voltage is detected between a voltage dividing point of the first voltage dividing resistor and a voltage dividing point of the second voltage dividing resistor, comprising the steps of:

dividing said second voltage dividing resistor to obtain a voltage dividing ratio of ½ and setting the voltage dividing ratio of said first voltage dividing resistor whereby the temperature characteristic of an output voltage between both the voltage dividing points when no pressure is applied such that it is becomes similar to the temperature characteristic of an output voltage of power supply means; and setting the voltage dividing ratio of said second voltage dividing resistor such that the temperature characteristic of a potential on the voltage dividing point of said second voltage dividing resistor is made equal to the temperature characteristic of a potential on the voltage dividing point of said first voltage dividing resistor.

7. A temperature compensation method for a semiconductor pressure detection device comprising a bridge circuit which is formed of a first bridge portion including two resistors each having no mutually opposite-polarity piezo-effect and a first voltage dividing resistor connected between said two resistors and having no piezo-effect and a second bridge portion including a second voltage dividing resistor having no piezo-effect in which an output voltage is detected between the voltage dividing points of said first and second voltage dividing resistors, comprising the steps of:

setting the voltage dividing ratio of said first voltage dividing resistor such that the temperature characteristic of a potential on the first voltage dividing point when no pressure is applied is linearized; and setting the voltage dividing ratio of said second voltage dividing resistor such that the temperature characteristic of a potential on the voltage dividing point of the second voltage dividing resistor when no pressure is applied is made equal to the temperature characteristic of a potential on the first voltage dividing point.

8. A temperature compensation method for a semiconductor pressure detection device comprising a bridge circuit which is formed of a first bridge portion including two resistors each having a mutually opposite-polarity piezo-effect and a first voltage dividing resistor connected between the two resistors and having no piezo-effect and a second bridge portion including two resistors each having a mutually opposite-polarity piezo-effect and a second voltage dividing resistor connected between the two resistors and having no piezo-effect, said first and second bridge portions being combined such that the adjacent resistors each have a mutually opposite piezo-effect, and first and second variable resistors connected to the voltage dividing points of said first and second voltage dividing resistors in which an output voltage is detected between the first and second variable resistors, comprising the steps of:

setting the voltage dividing ratio of the first and second voltage dividing resistors such that the temperature characteristic of an output voltage between both the voltage dividing points of said first and second voltage dividing resistors when no pressure is applied becomes similar to the temperature characteristic of an output voltage of power supply means;

causing a value of one variable resistor connected to one of the first and second voltage dividing resistors to become zero, the amount of variation of a potential on the voltage dividing point of said one voltage dividing resistor being smaller than that on the voltage dividing point of the other voltage dividing resistor; and setting a value of the other variable resistor such that the amount of variation of a potential on the output terminal of said other variable resistor resulting from a temperature variation is made equal to an amount of variation of a potential on the output terminal of said one variable resistor resulting from the temperature variation.

* * * * *